Patented Apr. 6, 1954

2,674,560

UNITED STATES PATENT OFFICE 2,674,560

PREPARATION OF INSULIN FROM PANCREAS GLANDS

Loyal C. Maxwell, Chicago, and William P. Hinkel, Brookfield, Ill., assignors to Armour and Company, Chicago, Ill., a corporation of Illinois No Drawing. Application August 29, 1951, Serial No. 244,281

9 Claims. (Cl. 167—75)

This invention relates to the preparation of insulin from pancreas glands.

The present application is a continuation-in-part of our co-pending application, Serial No. 102,928, filed July 2, 1949, now abandoned, for preparation of insulin from pancreas glands.

In the commercial manufacture of insulin, the practice has been to extract the insulin from pancreas glands, using acidified alcoholic solutions employing hydrochloric acid or sulphuric acid. In such extraction steps, the pH of the extraction mixture is normally maintained at about 2.0. The pancreas glands are hashed and, in the usual commercial process, the insulin is extracted therefrom by using a solvent consisting of ethyl alcohol and hydrochloric acid, the alcohol being in a concentration of approximately 65% to 75% on the basis of the extraction volume after equilibrium is attained. After adjusting the pH to about 2.0, the mixture is agitated for several hours and centrifuged, the meat solids being reextracted under the same conditions. The centrifugate liquors from both steps are then made alkaline, using ammonia, and are filtered. The filtered extracts are concentrated and further purified for insulin recovery. The foregoing process gives a yield which amounts to only a small percentage of the insulin believed to be actually contained in the glands.

Other workers more recently have reported using weak organic acids, such as acetic, formic, propionic and butyric acids, in the alcoholic extraction mixture for the recovery of insulin. In the use of acetic, formic and hydrochloric acids, as set out above, in the extraction of insulin, it is necessary after removing the gross pancreatic tissue after extraction to neutralize the acidity in order to clarify the extracts by filtration. This is usually performed by adjusting the pH of the extracts to pH 7 to 8.5 by the addition of aqueous ammonia. This alkalinization also causes the precipitation and allows the removal of undesirable protein impurities which are precipitated in this pH range. In the use of such acids, however, the adjustment of the pH to this range prior to filtration results in the introduction of very large amounts of soluble ammonium salts into the extracts. This is undesirable for several reasons and particularly because of its adverse effect upon insulin recovery. The presence of such large amounts of salts raises the boiling point of the extracts during the later concentration in the still to remove alcohol and otherwise is responsible for large losses of insulin.

We have discovered that excellent recoveries of insulin can be obtained without the introduction of large quantities of soluble ammonium salts into the extracts by using oxalic acid in the alcoholic extraction mixture. Oxalic acid has the property of providing effective extraction of insulin, while using a relatively small amount as compared with the other organic acids, while at the same time the ammonium salts of oxalic acid are relatively insoluble in the aqueous-alcoholic insulin extractant, and the salts are removed when the extracts are filtered after the pH has been adjusted toward neutrality or to the alkaline side with aqueous ammonia. While oxalic acid is normally a solid, the acid crystals are readily dissolved in the alcoholic extraction solution and is effectively employed for extraction in the pH range of 2.5 to 4.0.

An object of the present invention is to provide a process in which oxalic acid is employed in the extraction step. A further object is to provide a process in which oxalic acid is used in the extraction step and subsequently removed from the process as an insoluble salt. Another object is to provide a process in which oxalic acid is employed to acidify the alcoholic extraction solution and in which a base is later added for the precipitation of the acid as an insoluble salt. A further object is to provide a new organic acid for use in the extraction step, the acid having special properties which increase the recovery of insulin and reduce losses heretofore experienced in the filtration and concentration steps. Other specific objects and advantages will appear as the specification proceeds.

In our process, pancreas glands from any source may be employed. The pancreas glands of cattle, hogs and other animals, and from fish, whales and like sources, may be used in the recovery of commercial yields of insulin.

In one embodiment of our process, a sufficient quantity of oxalic acid crystals is added to an aqueous-alcoholic solution of between 65% and 95% alcohol content so that, after addition of the macerated pancreatic tissue, the pH of the extraction mixture is about 3.0 and the alcohol content about 60% to 65% after equilibrium is attained. After stirring and allowing sufficient time for extraction, the meat solids are removed by centrifugation and reextracted in 60 to 65% alcohol with the addition of sufficient acid to maintain the same pH and again centrifuged. The pH of the centrifuged extracts is adjusted to pH 6.0 to 9.5 with the addition of aqueous ammonia and filtered through a filter press to remove precipitated insoluble salts and proteins and other suspended material. The clear filtered extracts are reacidified to a pH of about 3.5 with sulphuric acid and further processed and concentrated and purified according to conventional and well-known procedures.

In acidifying the alcoholic extraction mixture with oxalic acid, we prefer to employ a pH range of about 2.5 to 4.0. Optimal insulin yields have been obtained in the range of 2.75 to 3.75.

After concentration of the filtrate and removal of the fat, the insulin in the concentrate may be precipitated by the addition of sodium chloride, and the salt cake thus obtained may be further purified by solubilizing in water and precipitating the insulin at its isoelectric point. The recovered precipitated insulin may be further solubilized and crystallized after the addition thereto of zinc acetate or zinc chloride, to thereby obtain the zinc insulin salt.

Instead of the conventional purification method just described, it will be understood that other well-known purification methods leading to the preparation of finished amorphous or crystalline insulin compositions may be used.

We prefer to remove lipoidal material in the filtrate after the above filtration step in which the insoluble salt and inert protein is removed and prior to the purification of the filtrate to obtain insulin. After the filtration step, the filtrate obtained is adjusted by the addition of sulphuric acid (or some other acid) to a pH of 3 to 3.5 and concentrated under reduced pressure to an alcohol content of 15 to 25%, preferably about 20%. The lipoidal material, which then separates, may be removed by filtration or centrifugation, and the filtrate concentrated again under reduced pressure to the aqueous phase. There is a further precipitation of lipoidal material, and this is then removed by filtration or centrifugation.

The lipoidal material is preferably separated by partial removal of the alcohol under vacuum in a still. The temperature in this step is preferably kept as low as possible, while the still is maintained under reduced pressure. We have obtained good results by maintaining temperatures of 60° to 70° F.

In the precipitation of inert proteins, it is advantageous to adjust the pH into the range of 5.2 to about 9.5, with the preferred range being 5.5 to 8.5. Our best results have been obtained in the range of pH 8.0 to 8.5. The inert protein material is effectively precipitated, and the removal of this material, together with the insoluble salts, has a highly beneficial effect upon the subsequent operations.

The solvent for the insulin may be any water-miscible organic solvent for insulin, such as ethyl alcohol, methyl alcohol, propyl alcohol, isopropyl alcohol, acetone, etc., or mixtures thereof. We prefer to use an aliphatic alcohol of less than 4 carbon atoms, and find ethyl alcohol the most desirable.

The concentration of the organic solvent in the extraction mixture should be sufficiently high to avoid substantial solubility of other substances, such as the pancreatic enzymes, and should not be so high as to produce substantial insolubilization of insulin. We find that an alcohol concentration of 50 to 85% by volume in the liquid present in the extraction mixture is satisfactory. Concentrations below 50% permit solubility of an undesirable amount of enzymes together with protein impurities, and concentrations above 85% produce a decreased yield of insulin. We prefer 60% to 75% alcohol concentration.

When we refer to "concentration" in this specification and claims, we mean the over-all concentration in the extraction mixture on the basis of the total volume of liquid present and not the concentration of the solvent added to the process.

The temperature at which the extraction is conducted may vary throughout a wide range, but we prefer to conduct the extraction step at temperatures between 0° and 15° C., and most suitably at about 10° C.

We believe that the higher yields of insulin obtained with the use of oxalic acid is due to a combination of desirable properties possessed by this acid which makes it particularly suited for use in the extraction of insulin from pancreatic tissue. This combination of desirable properties consists of the property of oxalic acid of promoting maximum solubilization and extraction of insulin from pancreatic tissue without the necessity of using the excessively high acidity (pH 2.0) required when using hydrochloric or sulphuric acid and, secondly, the property that the salts of oxalic acid are relatively insoluble in the extraction solvent, so that the high salt concentration incurred in the extracts using hydrochloric, acetic or formic acid, or other acids of this type, is avoided.

The use of oxalic acid also allows the removal of other undesirable substances from the extracts, such as iron, copper or heavier metals whose salts may be present in small amounts as salts of the metals which may have been introduced as contaminations in the reagents or materials from the equipment employed in processing. It is known that the presence of such metallic ions causes insulin losses. The salts of such metals with oxalic acid are comparatively insoluble in the extractant employed and are removed when the extracts are neutralized with ammonia and filtered. Such metallic ions are not so completely removed when sulphuric, hydrochloric, formic, acetic acids, etc. are used, since the salts of these acids are comparatively soluble in the extractant and adjustments of the extracts to the alkaline side does not serve to remove them as completely. The hydroxides of these metals are somewhat more soluble than the oxalate salts under the conditions of the process.

While somewhat larger amounts of oxalic acid are required to lower the pH of the extraction mixture proportionally than are required when strong acids, such as hydrochloric or sulphuric, are used, this is compensated for by the fact that maximum insulin extraction with oxalic acid is obtained in a pH range of 2.5 or 2.75, while with hydrochloric or sulphuric acid it is generally conceded that a pH of about 2.0 is optimal. This represents several times the hydrogen ion concentration necessary with oxalic acid, and it is believed that the extraction at the lower acidity of pH 2.5 or 2.75 results in better insulin recovery.

We have found that when weak organic acids, such as acetic or formic are used, it is necessary to use sufficient of these acids to lower the pH of the extraction mixture to about 3.0 to 3.5 in order to obtain optimal insulin extraction. These weak organic acids have acid dissociation constants of $1.8 \times 10^{-4}$ to $1.5 \times 10^{-5}$, and three to ten times the weight of such acids is required as compared to the quantity of oxalic acid required to lower the extraction mixture proportionally. The use of such weak acids we consider impractical, since they considerably increase the cost of processing due to the excessive quantities required. Oxalic acid is comparatively a stronger acid, having an acid dissociation constant of $6.5 \times 10^{-2}$, and we find this strength of acid particularly suitable for our purposes. We do not find that acids with a dissociation constant of less than $1 \times 10^{-3}$ are suitable from a practical standpoint for insulin extraction.

In adjusting the pH of the centrifuged extracts upward in order to precipitate and remove undesirable proteins and insoluble salts of oxalic acid, we prefer to use a relatively weak base as an alkalinizing agent in order to avoid local spots of unduly high alkalinity such as may occur using a strong base. We find that aqueous ammonia (ammonium hydroxide) is suitable, and we prefer its use. However, various weak or strong bases can be used, although it is necessary in order to avoid the introduction of large quantities of soluble salts into the extracts, to use a base which forms relatively insoluble salts with oxalic acid in the given environment when the pH is adjusted to pH 5.5 to 9.5. In the case of ammonia or sodium hydroxide, the precipitation of insoluble ammonium or sodium oxalate starts at about pH 5.0, the precipitation being more complete with increasing alkalinity. In the case of oxalic acid, the precipitation of ammonium oxalate is about 80 to 90% complete at pH 8.0 to 8.5.

Therefore, the precipitation of insoluble salts and of undesirable proteins can be conducted between pH 6.0 and pH 9.5. We, however, prefer to adjust the extracts to between pH 7.5 and 8.5 before filtration, since a higher alkalinity is not advantageous and a minimum amount of the salts of oxalic acid remains soluble in this range.

Specific examples illustrating our improved process may be set out as follows:

Example I (oxalic acid)

One pound of hashed beef pancreas was extracted in 1000 cc. of 82% ethyl alcohol containing 15 grams of oxalic acid crystals. After stirring and when equilibrium was attained, the pH of the extraction mixture was 3.0 and the alcohol concentration about 63% by volume. The mixture was then centrifuged and the removed solids re-extracted in 1000 cc. of 65% alcohol containing 3 grams of oxalic acid to maintain the pH at 3.0. The combined centrifugate liquors were then adjusted to pH 8.3 by the addition of aqueous ammonia and filtered. The clear filtered extracts were then adjusted to pH 3.5 with dilute sulphuric acid.

For assay purposes, the insulin in the filtered extracts was precipitated by the addition of anhydrous alcohol and ether, and the precipitated insulin dissolved in water and subjected to biological assay on mice. The biological assay showed the insulin content of the extracts to be equivalent to 1837 International units.

Example II (oxalic acid)

40 pounds of pork pancreas were hashed and added to 47 liters of 82% alcohol containing 800 grams of oxalic acid. After stirring and when equilibrium was attained, the pH was 3.0 and the alcohol concentration about 65%. The meat solids were removed and reextracted in 40 liters of 65% alcohol containing 150 grams of oxalic acid. After centrifuging, the combined extracts were adjusted to pH 8.5 with aqueous ammonia and filtered through a filter press. The clarified extracts were adjusted to pH 3.5 with dilute sulphuric acid and concentrated in vacuo to remove the alcohol. After filtration, the aqueous concentrate was subjected to biological assay and found to contain 2096 International units for each pound of pancreas glands processed.

Example II-A (control hydrochloric acid)

40 pounds of pork pancreas glands from the same lot of glands used in Example II (oxalic acid) were similarly processed with the exception that hydrochloric acid was used in the extraction instead of oxalic acid. The aqueous concentrate by biological assay was found to contain 930 International units of insulin per pound of glands processed.

Example III (oxalic acid)

40 pounds of frozen beef pancreas glands were hashed into 47,000 cc. of 82% alcohol containing 600 grams of oxalic acid. The pH of the extraction mixture was 3.1 and the alcohol concentration 65% after equilibrium was attained. After extraction by stirring, the meat solids were removed by centrifugation and reextracted in 40,000 cc. of 65% alcohol containing 100 grams of oxalic acid. The extracts were combined after centrifugation and adjusted to pH 8.5 by the addition of aqueous ammonia and then filtered. The clear filtered extracts after filtration to remove insoluble ammonium salts of oxalic acid together with precipitated inert proteins was acidified to pH 3.5 by the addition of dilute sulphuric acid.

A sample of the filtered alcoholic extracts at this stage was submitted to biological assay and the insulin content of the extracts was found to be 1860 units per pound of pancreas gland processed.

The filtered extracts were then concentrated in vacuo to remove alcohol and freed from fats by filtration. A biological assay of the resulting aqueous concentrate showed that the insulin recovered therein amounted to 1540 International units per pound of glands processed.

Example III-A (formic acid)

The pH of the extraction mixture after stirring and when equilibrium was attained was pH 3.0 and the alcohol concentration about 63%. After centrifuging the meat solids were extracted in 40,000 cc. of 65% alcohol containing 0.5 pound formic acid. After centrifuging the combined extracts were adjusted to pH 8.5 with aqueous ammonia and filtered.

A sample of the filtered alcoholic extracts was removed at this stage for assay. Biological assay indicated the insulin therein to amount to 1620 units per pound of glands processed.

The filtered extracts were then reacidified, concentrated and freed of fat by a procedure identical with that employed in Example III. The recovery of insulin in the aqueous concentrate amounted to 990 units per pound of glands processed.

Example IV (oxalic acid)

One pound of hashed beef pancreas was extracted in 1000 cc. of 82% alcohol containing oxalic acid. After stirring and when equilibrium was attained, the pH was 2.75 and the alcohol concentration about 65%. The meat solids were removed and reextracted in 65% alcohol containing oxalic acid at a pH of 2.75. After centrifuging, the combined extracts were adjusted to pH 8.5 with aqueous ammonia and filtered through a filter press. The clarified extracts were adjusted to 3.5 with dilute sulphuric acid and concentrated under vacuum to remove the alcohol. After filtration, the aqueous concentrate was subjected to biological assay and found to contain about 2,000 International units.

Examples II and II–A, and III and III–A, serve to demonstrate the saving effected in insulin recovery following concentration of the alcoholic extracts by use of oxalic acid, as compared to the lesser recovery obtained by an acid such as hydrochloric or formic, whose ammonium salts remain in solution and are carried without removal through the processing.

While, in the foregoing specification, certain steps of the process have been described in considerable detail for the purpose of illustrating embodiments of the invention, it will be understood that such details may be varied widely by those skilled in the art without departing from the spirit of our invention.

We claim:

1. A process for obtaining insulin from pancreas glands, comprising subjecting said glands to extraction at a pH of 2.5 to 4.0 with a mixture of oxalic acid and an organic solvent for insulin which is compatible with oxalic acid, and recovering insulin in the extract.

2. A process for obtaining insulin from pancreas glands, comprising subjecting said glands to extraction at a pH of about 2.5 to 4.0 with a mixture of oxalic acid and an organic solvent for insulin which is compatible with oxalic acid, separating the solid from the liquid portions, and recovering insulin in the liquid portion.

3. A process for obtaining insulin from pancreas glands, comprising subjecting said glands to extraction at a pH of about 2.5 to 4.0 with a mixture of oxalic acid and alcohol, and recovering insulin in the extract.

4. A process for obtaining insulin from pancreas glands, comprising subjecting said glands to extraction at a pH of about 2.75 to 3.75 with a mixture of oxalic acid and an organic solvent for insulin which is compatible with oxalic acid, and recovering insulin in the extraction.

5. A process for obtaining insulin from pancreas glands, comprising extracting said glands at a pH of about 3.0 with oxalic acid and an organic solvent for insulin which is compatible with oxalic acid, separating the solid portion from the liquid portion, and recovering insulin in the liquid portion.

6. A process for obtaining insulin from pancrease glands, comprising subjecting said glands to extraction at a pH of about 2.75 to 3.75 with a mixture of oxalic acid and ethyl alcohol, and recovering insulin in the extract.

7. In a process for obtaining insulin from pancreas glands, the steps of extracting said glands at a pH of 2.5 to 4.0 with a mixture of oxalic acid and an organic solvent for insulin which is compatible with oxalic acid, raising the pH of the extract mixture with ammonia to about 5.5 to 8.5 to precipitate an ammonium salt of oxalic acid, and removing the solids from the extract.

8. In a process for obtaining insulin from pancreas glands, the steps of extracting said glands with a mixture of oxalic acid and alcohol and at a pH of about 2.5 to 4.0, adding ammonia to bring the pH into the range of about 5.5 to 8.5 at which insoluble ammonium salts are formed, and removing said salts.

9. A process for extracting macerated pancreas glands to obtain insulin, comprising extracting said glands in an aqueous alcoholic extractant containing sufficient oxalic acid to maintain the acidity of the extraction mixture between pH 2.75 to 3.75, removing the suspended tissue solids, adding ammonium hydroxide to the separated liquid portion, in sufficient quantity to bring the pH to about 5.5 to 8.5 to cause precipitation of ammonium oxalate salts, and recovering insulin from the separated liquid portion.

References Cited in the file of this patent

UNITED STATES PATENTS

| Number | Name | Date |
|---|---|---|
| 2,174,862 | Sahyun | Oct. 3, 1939 |
| 2,353,016 | Daughenbaugh | July 4, 1944 |
| 2,449,076 | Lautenschlager | Sept. 14, 1948 |
| 2,466,487 | Scott | Apr. 5, 1949 |

OTHER REFERENCES

Somogyi on Preparation of Insulin in: Journal Biol. Chem., volume 60, 1924, pages 34 to 47, 54 to 57.

Jensen, "Insulin," 1938, pages 24 to 30.

Merck Index, 5th Edition, 1940, pages 35 and 36.